US006965881B1

(12) United States Patent
Brickell et al.

(10) Patent No.: US 6,965,881 B1
(45) Date of Patent: Nov. 15, 2005

(54) DIGITAL CREDENTIAL USAGE REPORTING

(75) Inventors: Ernie F. Brickell, Portland, OR (US); Wesley Deklotz, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 446 days.

(21) Appl. No.: 09/608,402

(22) Filed: Jun. 30, 2000

Related U.S. Application Data

(60) Provisional application No. 60/199,220, filed on Apr. 24, 2000.

(51) Int. Cl.[7] .............................. H04K 1/00; G06F 17/60
(52) U.S. Cl. ............................ 705/76; 705/18; 705/44; 380/25
(58) Field of Search ............................ 705/44, 75, 76, 705/67, 18; 308/25

(56) References Cited

U.S. PATENT DOCUMENTS

| | | | |
|---|---|---|---|
| 5,224,163 A | | 6/1993 | Gasser et al. |
| 5,659,616 A | * | 8/1997 | Sudia ........................... 705/76 |
| 5,878,138 A | * | 3/1999 | Yacobi ......................... 705/69 |
| 5,983,208 A | * | 11/1999 | Haller et al. ................... 705/40 |
| 6,021,202 A | * | 2/2000 | Anderson et al. ............. 705/54 |
| 6,105,010 A | * | 8/2000 | Musgrave ..................... 705/44 |
| 6,111,506 A | * | 8/2000 | Yap et al. ................. 340/572.1 |
| 6,418,467 B1 | * | 7/2002 | Schweitzer et al. ......... 709/223 |
| 6,442,526 B1 | * | 8/2002 | Vance et al. |

FOREIGN PATENT DOCUMENTS

| | | | | |
|---|---|---|---|---|
| DE | EP 0 848338 A1 | * | 6/1998 | ........... G06F 17/30 |
| JP | EP 0 786 728 A1 | * | 7/1997 | ........... G06F 15/00 |

OTHER PUBLICATIONS hlp://ww.valicel.coeproducts/product services.html, E—rransactions Just Got a Lot Safer. —Valicerq Inc.*
http://www.valicert.com/products/product_services.html, E-Transactions Just Got a Lot Safer, Valicert, Inc.

* cited by examiner

*Primary Examiner*—James P. Trammell
*Assistant Examiner*—Daniel L. Greene
(74) *Attorney, Agent, or Firm*—Fish & Richardson P.C.

(57) ABSTRACT

An credential verification service (CVS) authenticates digital credentials, such as, digital certificates, at the request of online service providers. The CVS stores the authentication results and transaction information in a central activity log. The transaction information can include a size of the transaction, the online service requesting the authentication, an internet protocol (IP) address of a computing device originating the transaction and the goods or services involved in the transaction. The CVS generates an activity report from the activity log that lists the authentication results and the transaction information. A fraud detection module within the CVS analyzes the activity log to identify any unusual patterns in order to identify fraudulent activities or general misuse of the digital credential.

34 Claims, 4 Drawing Sheets

40

Activity Log      May 2000

Digital Certificate 1.234.5.6778.9

*Jon Smith (Primary Owner)*

| | | | | | |
|---|---|---|---|---|---|
| 10/15/99 | 10:02 AM | www.amazon.com | Office | $15.25 | Approved |
| 10/15/99 | 11:04 AM | www.ebay.com | Office | $100.25 | Approved |
| 10/15/99 | 09:36 PM | www.amazon.com | Home | $56.65 | Approved |
| 10/15/99 | 04:32 PM | www.etoys.com | Portable | $25.65 | Approved |

*Susan Johnson (Delegate)*

| | | | | | |
|---|---|---|---|---|---|
| 10/15/99 | 10:02 AM | www.healthcare.com | Work | document accessed | Approved |
| 10/15/99 | 10:05 AM | www.healthcare.com | Work | document submitted | Approved |
| 10/15/99 | 10:08 AM | www.healthcare.com | Work | document accessed | Approved |
| 10/15/99 | 10:09 AM | www.healthcare.com | Work | document accessed | Approved |

*Albert White (Delegate)*

| | | | | | |
|---|---|---|---|---|---|
| 10/15/99 | 07:42 AM | www.healthcare.com | Work | document accessed | Approved |
| 10/15/99 | 11:07 AM | www.bankone.com | Work | transfer $1,000 | Rejected |

FIG. 3

DIGITAL CREDENTIAL USAGE REPORTING

Priority is claimed from U.S. provisional patent application Ser. No. 60/199,220, filed Apr. 24, 2000.

BACKGROUND

Cryptography provides the basis for a number of privacy and authentication mechanisms used in computer-based systems. One such mechanism is a digital signature, which is often used to authenticate the sender of an electronic message. To create a digital signature, the sender first creates a private signature key and a corresponding public verification key. To sign a message or other document, the sender performs a computation that takes as input the message and the private signature key and produces as output a digital signature for that message. To verify a digital signature, a receiver performs a computation that takes as input the message, the digital signature for that message, and the public verification key, and produces as output either "signature verified" or "signature failed to verify."

In order to facilitate the authentication of a digitally signed document, the receiver must be assured that the public verification key that is used to verify the signature is indeed the public verification key belonging to the sender of the message. Typically, the receiver will obtain a digital certificate, which contains the identity of the sender, the public verification key of the sender, and other information. Typically, this digital certificate is digitally signed by a certification authority. Other mechanisms are also used for establishing the correspondence between an identity and a public verification key such as an entry in a database.

DESCRIPTION OF DRAWINGS

FIG. 3 is an example activity log.

DESCRIPTION

A user's "digital credential", as used herein, refers to the security mechanisms associated with the user's identity. For example, a user's digital credential can include one or more digital signature keys relating to one or more digital certificates. In addition, a user's digital credential can be any other suitable cryptographic security mechanism, such as a mechanism for use in a proprietary cryptographic scheme.

Validating a user's digital credential, therefore, can include one or more tasks. Examples include verifying that the user's digital signature is valid using the public key in the user's digital certificate and validating the digital certificate, which can include several additional tasks such as using a key of the certification authority to validate that the digital signature on the digital certificate is valid, verifying that the digital certificate has not been revoked or suspended, and validating the key of the certification authority.

Figure 1:
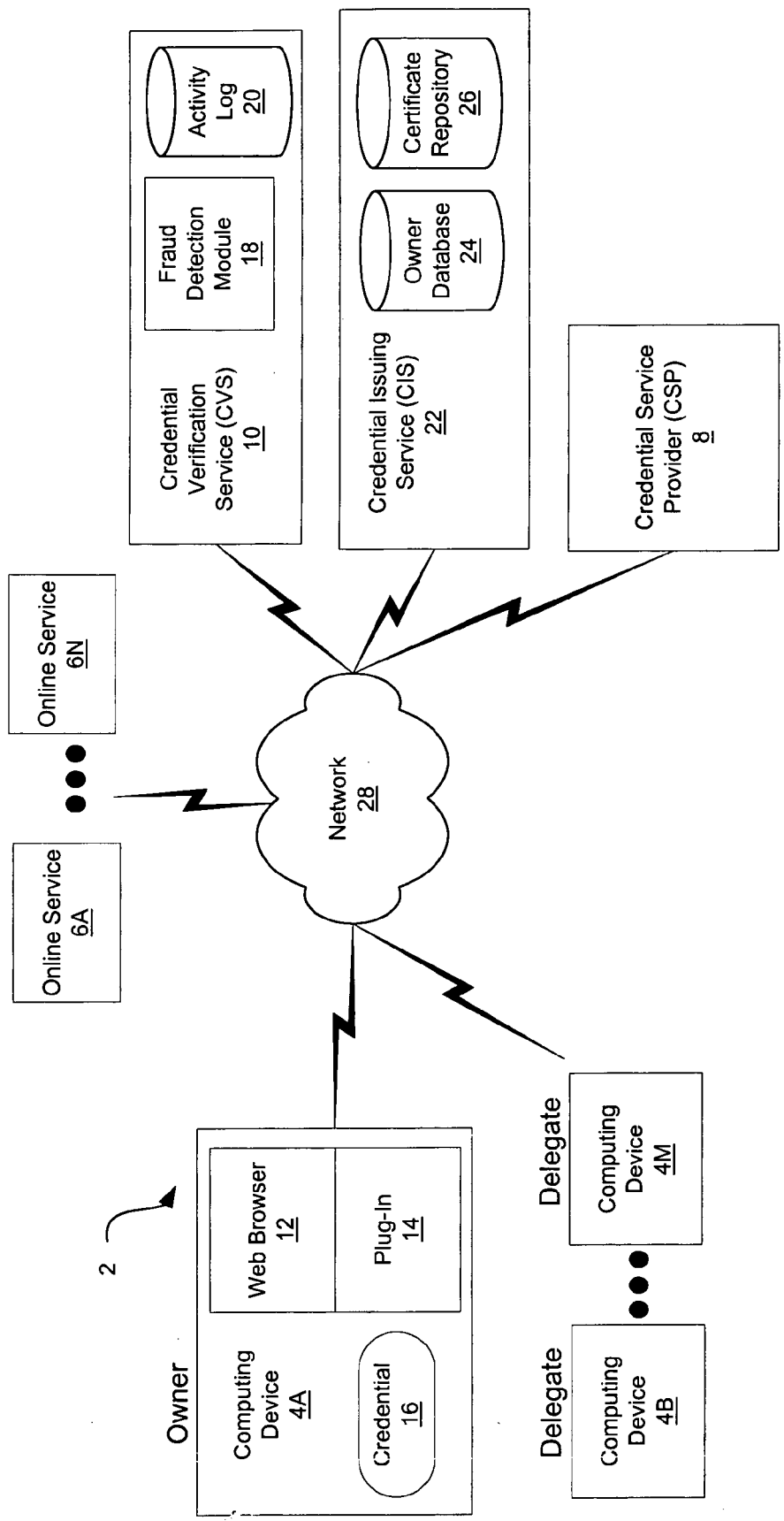
FIG. 1 is a block diagram illustrating one example of a system that monitors the usage of digital credentials.

FIG. 1 is a block diagram illustrating one example of a system 2 that tracks the usage of digital credentials, generates activity reports, and identifies potential fraudulent activities or other misuse. As explained in detail below, system 2 allows timely detection of fraudulent activity or general misuse of digital credentials.

Web browser 12, such as Internet Explorer™ from Microsoft™ Corporation of Redmond, Wash., executes in an operating environment provided by computing device 4A and allows an owner of digital credential 16 to remotely access online services 6 via network 28. Generally, online services 6 represent web-based venues that support secure electronic transactions. For example, online services 6 can be web-based retailers of consumer products such as books, movies, software, toys, games and the like. Alternatively, online services 6 can be business-to-business web sites such as online marketplaces for medical and other supplies. Other examples include online banking institutions, brokerage firms, and health care services. Similarly, authorized delegates of the user use web browsers (not shown) executing on computing devices 4B through 4M to access online services 6 and conduct secure transactions using a digital credential that has been authorized by the user to act on behalf of the user for specified uses.

Computing devices 4 represents general purpose computing systems suitable for interacting with network 28. One example of a suitable computing device 4 is a personal computer. In addition, each computing device 4 can be a laptop computer, a handheld computer, a personal digital assistant (PDA), such as a Palm™ organizer from Palm Inc. of Santa Clara, Calif., or even a network-enabled cellular telephone. Network 28 represents any communication network, such as a packet-based digital network like the Internet.

Credential service provider (CSP) 8 provides a central service by which a user can manage his or her digital credentials. More specifically, CSP 8 allows a user to request a digital credential, revoke a digital credential and define one or more delegates that are authorized to use their own digital credential to act in behalf of the user for specified functions.

In order to obtain digital credential 16, the user directs web browser 12 to CSP 8, generates a private signature key and a public verification key, and requests a digital certificate. The user submits the public verification key and a variety of information, such as name and address, that is validated during the application process.

CSP 8 submits the information to credential issuing service (CIS) 22 that, as a certificate authority, issues a corresponding digital credential 16, including a digital certificate and signature key, and records the owner information in owner database 24. In this fashion, the user becomes the "owner" of his or her digital credential 16. After CIS 22 issues digital credential 16 the owner can access CSP 8 and designate one or more authorized delegates.

The owner uses digital credential 16 to securely access online services 6, present digitally signed documents and otherwise conduct secure transactions. In one configuration, web browser 12 establishes a secure communication link with a web server at one of the online services 6 using a secure communications protocol, such as the Secure Socket Layer (SSL). When accessed, the web server issues a "challenge" to web browser 12. Web browser 12 responds by signing the challenge with his private signature key and communicating digital credential 16 and the signed challenge to online service 6. In another configuration, web browser 12 uses his private signature key to digitally sign a document presented to online server 6, such as when the owner or delegate is submitting a confidential medical diagnosis or a prescription request to a web-based health care service.

Online services 6 can opt to validate digital credential 16 directly, such as by verifying the digital signatures using the public key and by checking a local database to verify the association between the public key and the user. However, online services 6 can also communicate the digital credential 16 to credential verification service 10 (CVS) for verification. In one configuration, online services 6 validate transactions of low monetary value locally and use CVS 10 to validate high value transactions.

To validate a digital credential 16, CVS 10 receives the digital credential, such as the digital signature and the digital certificate, from online services 6 and interacts with CIS 22. CVS 10 accesses CIS 22 to obtain the public key for CIS 22, as a certificate authority, and verifies the digital signature. Next, CVS 20 accesses CIS 22 to determine whether digital credential 16 has been revoked, as indicated by certificate repository 26. CVS 20 stores the result of the verification, whether successful or not, in activity log 20.

In one configuration, CSP 8 allows the user to generate a number of digital signature keys associated with his identity and assign a "friendly name" to each key. For example, the user may assign names such as: Office Key, Home Key, Portable Key. As described below, this allows the user to more readily track usage of the digital signature keys.

System 2 incorporates many features that allow an owner or delegate to detect unauthorized use of the digital signature key in the event digital signature key is misappropriated or otherwise misused. For example, when verifying digital signature during each secure transaction, CVS 10 can automatically send an activity report to web browser 12, which can display the activity report to the user. In this fashion the user can readily identify whether the digital signature key is being misused.

In addition, the owner or delegate can access CSP 8 and request an activity report that details any usage of digital signature key. Upon receiving such a request, CSP 8 communicates the request directly to CVS 10. CVS 10 examines activity log 20, extracts the relevant activity information, formulates a report and communicates the report to CSP 8. CSP 8 electronically presents the report to the user via network 22. The owner or delegate can also configure CSP 8 to periodically generate the report and electronically mail the report to the user. Alternatively, CSP 8 can mail a physical copy of the report to the user.

In addition to the above-described techniques by which an owner or delegate can detect misuse of digital credential, fraud detection module 18 of CVS 10 applies fraud detection techniques to activity log 20 in order to automatically identify misuse. As described in detail below, fraud detection module 18 analyzes activity log 20 to identify any unusual patterns that may indicate misuse.

Figure 2:
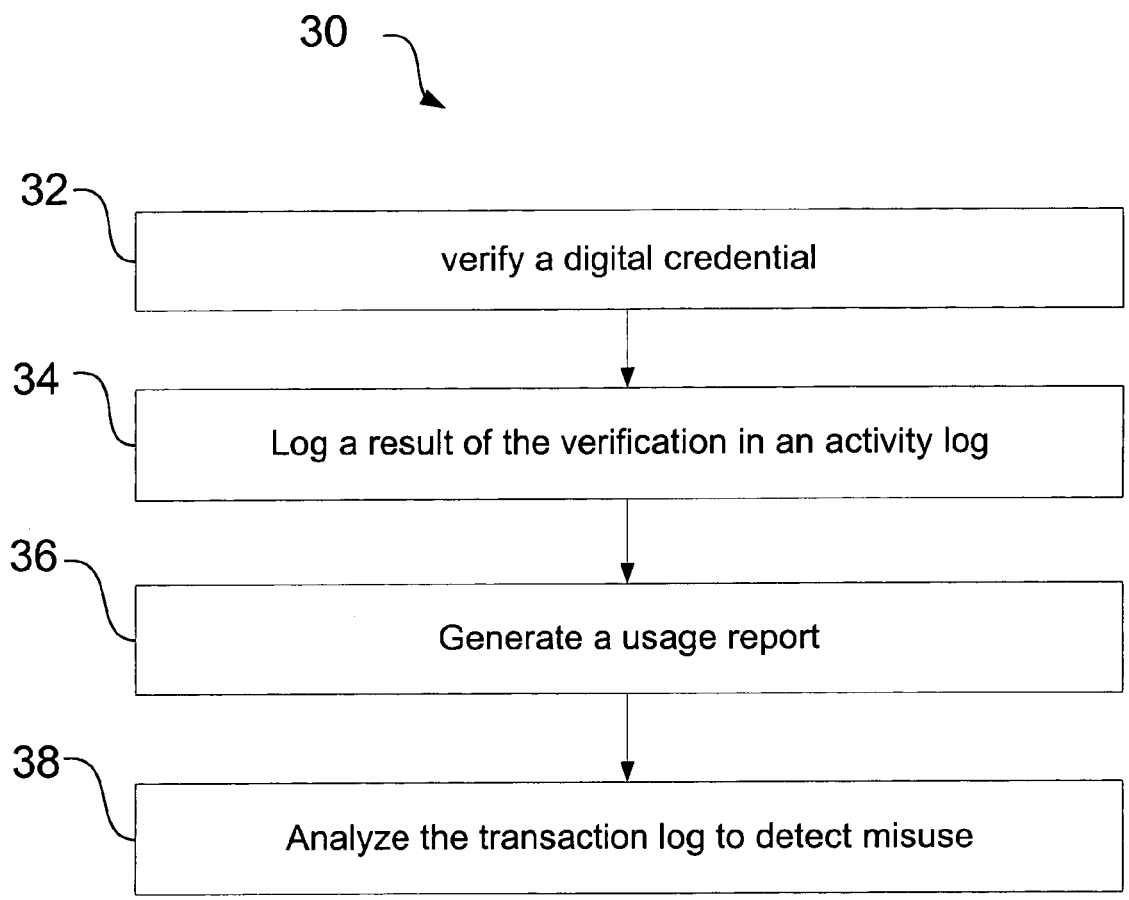
FIG. 2 is a flow chart illustrating one example of a process for monitoring the usage of digital credentials.

FIG. 2 is a flow chart illustrating a process 30 further illustrating how system 2 monitors the usage of digital signature keys and identifies potential fraudulent activities or general misuse. Each online service 6 processes secure transactions by communicating digital credential 16 to CVS 10 for verification (32). As described above, CVS 10 cooperates with CIS 22 to verify digital credential 16 including determining whether digital credential 16 is revoked. In one configuration, however, online services validate the digital credential and communicate transaction information to CVS 10.

CVS 10 stores the result of each verification in activity log 26 (34). In addition, CVS 10 stores relevant transaction information such as a date and time of the transaction, the online service 6 that is involved in the transaction, the type of transaction, the device used to access the online service 6, such as a laptop computer, cell phone or a PDA, the value of the transaction, and location and position information, such as an IP address or a name of computing device 4.

In order to facilitate the timely identification of misuse of digital credential 16, CVS 10 generates activity reports that detail the information stored in activity log 20 (26). As discussed above, CVS 10 generates the activity reports in a variety of ways and at a variety of times. For example, CVS 10 can automatically generate an activity report when handling each verification request, thereby frequently providing the information to the user. In addition, CVS 10 can periodically generate activity reports or upon request by the owner.

CVS 10 also tailors each activity report to the requester such that the owner of digital credential 16 can view all activity, including any activity by the delegates. An individual delegate, however, can only view activity reports that list his or her activity.

Fraud detection module 18 of CVS 10 analyzes activity log 20 to identify any unusual patterns in order to identify fraudulent activities. For example, a significant increase in the number or the size of the transactions can indicate misuse. A change in the types of transactions can indicate misuse. In addition, any indication that digital signature key 16 is suddenly being used from a different computing device, such as a change from a frequently used internet protocol (IP) address to a previously unused IP address, can also indicate misuse. Upon detecting potential misuse, CVS 10 communicates an activity report to the owner alerting him or her of the activity. In this manner, the owner can readily determine whether any fraudulent activity or general misuse has indeed occurred and the extent of the activity.

If the owner determines that unauthorized activities have indeed occurred, the owner can access CSP 8 and revoke digital credential 16. For example, the owner can revoke the associated digital certificate. Alternatively, the owner can create a new private signature key and a new public verification key and sign this public verification key with the old private signature key. System 2 can issue a new digital certificate for this new verification key. CSP 8 communicates the revocation to CIS 22, which updates the status of digital credential 16 in certificate repository 26, thereby causing any future verifications by CVS 10 of the digital credential to fail. Thus, the owner can immediately stop the fraudulent activity.

In addition, the activity report can be provided to an authorized operator of CSP 8 of CVS 10. Furthermore, an activity report detailing activity at a specific online service 6 can be generated and provided to an authorized operator at the online service.

It this manner, system 2 helps detect unauthorized use of the digital signature key in the event digital signature key is misappropriated. These features are especially advantages to professional services such as the healthcare profession. To further illustrate these benefits, consider a healthcare professional accessing a healthcare oriented online service and requesting access to healthcare information or seeking to submit a prescriptions or diagnosis. The online service communicates transaction information describing the access request and the medical professional's digital credential to the central credential verification service. Upon receiving a verification result from the credential verification service, the healthcare oriented service provides access to the medical records. Subsequently, the healthcare oriented service receives an activity report from the credential verification service and provides the report to healthcare professional.

FIG. 3 is an example activity report 30 generated by CVS 10. Activity report 30 lists the activities logged in activity log 20, broken down by owner and delegate. For each authentication request, the example activity report 40 lists the date and time, the online service involved in the transaction, the name of the computing device 4 used by the user to originate the transaction, the value of the transaction, the type of the transaction, and the authentication result.

Figure 4:
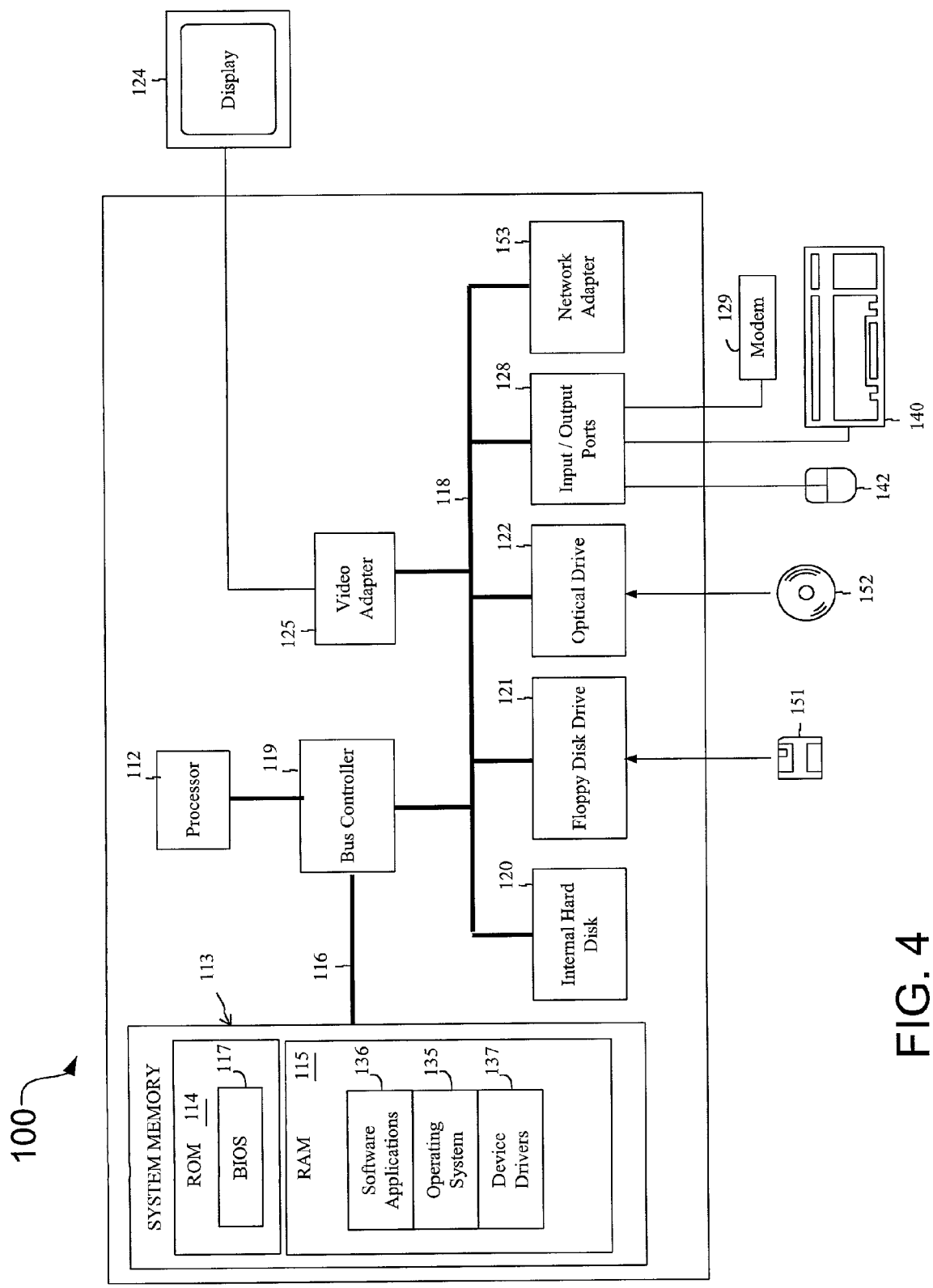
FIG. 4 is a block diagram illustrating a computer suitable for implementing embodiments of the invention.

FIG. 4 illustrates a programmable computing system (system) 100 that provides an operating environment suitable for use as a computing device 4 or as a server within CSP 8, CVS 10 or CIS 22. The system 100 includes a processor 112 that represents any suitable microprocessor such as the PENTIUM® family of microprocessors manufactured by the Intel Corporation of Santa Clara, Calif. Other examples include the MIPS® family of microprocessors, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. In various configurations, system 100 represents any server, personal computer, laptop or a hand-held PC, a personal digital assistant (PDA) or a network-enabled cellular phone.

System 100 includes system memory 113, including read only memory (ROM) 114 and random access memory (RAM) 115, which is connected to the processor 112 by a system data/address bus 116. Input/output bus 118 is connected to the data/address bus 116 via bus controller 119. In one embodiment, input/output bus 118 is implemented as a standard Peripheral Component Interconnect (PCI) bus. The bus controller 119 examines all signals from the processor 112 to route the signals to the appropriate bus. Signals between the processor 112 and the system memory 113 are merely passed through the bus controller 119. However, signals from the processor 112 intended for devices other than system memory 113 are routed onto the input/output bus 118.

Various devices are connected to the input/output bus 118 including hard disk drive 120, floppy drive 121 that is used to read floppy disk 151, and optical drive 122, such as a CD-ROM drive that is used to read an optical disk 152. The video display 124 or other kind of display device is connected to the input/output bus 118 via a video adapter 125.

Users enter commands and information into the system 100 by using a keyboard 140 and/or pointing device, such as a mouse 142, which are connected to bus 118 via input/output ports 128. Other types of pointing devices (not shown) include track pads, track balls, joysticks, data gloves, head trackers, and other devices suitable for positioning a cursor on the video display 124. System 100 also includes a modem 129 that is typically used to communicate over wide area networks (not shown), such as the Internet using either a wired or wireless connection.

Software applications 136 and data are typically stored via one of the memory storage devices, which may include the hard disk 120, floppy disk 151, CD-ROM 152 and are copied to RAM 115 for execution. In one embodiment, however, software applications 136 are stored in ROM 114 and are copied to RAM 115 for execution or are executed directly from ROM 114.

In general, the operating system 135 executes software applications 136 and carries out instructions issued by the user. The Basic Input/Output System (BIOS) 117 for the system 100 is a set of basic executable routines that have conventionally helped to transfer information between the computing resources within the system 100. Operating system 135 or other software applications 136 use these low-level service routines. In one embodiment system 100 includes a registry (not shown) that is a system database that holds configuration information for system 100.

The invention has been described in reference to a variety of embodiments. These and other embodiments are within the scope of the following claims.

What is claimed is:

1. A method comprising:
   receiving, over a data transmission network, use information describing a first use of a digital credential by an owner of a digital credential, at any of a plurality of different services where the digital credential can be used, the digital credential being a digital security mechanism associated with a the owner's identity;
   receiving use information describing a second use of the digital credential by a delegate of the owner of the digital credential, at any of the plurality of different services where the digital credential can be used;
   storing the use information in an activity log;
   generating an activity report for the delegate based on the activity log;
   generating an activity report for the owner based on the activity log;
   allowing said owner to view all reports; and
   allowing said delegate to view only the activity report for the delegate and not the activity report for the owner or activity reports for other delegates.

2. The method of claim 1, wherein the use information includes transaction information.

3. The method of claim 1, wherein the use information includes verification information for the digital credential.

4. The method of claim 2, wherein the transaction information includes at least one of a message that was signed, a transaction value, an online service, an internet protocol (IP) address, a value of the transaction, a date of the transaction and a the time of the transaction.

5. The method of claim 1, wherein the digital credential includes a digital signature key, and further wherein generating the activity report includes associating a name to the digital signature key and listing the name of the digital signature key.

6. The method of claim 1, wherein generating the activity report for the owner includes generating the activity report upon request by an owner of the digital credential.

7. The method of claim 1, wherein generating the activity report includes generating the activity report each time the digital credential is verified.

8. The method of claim 1, wherein generating the activity report includes generating a report periodically.

9. The method of claim 1 further including analyzing the activity log to detect misuse of the digital credential.

10. The method of claim 6, wherein generating the activity report includes listing activity for a plurality of digital signature keys associated with the owner.

11. The method of claim 1 further comprising:
    authorizing one or more delegates to use a delegated digital credential to act on behalf of the owner of the digital credential for specified functions, wherein verifying the use of the digital credential includes determining whether the delegated digital credential was authorized for the specific use.

12. The method of claim 1, wherein generating the activity report for the owner includes generating activity reports of the delegates of the owner.

13. A method comprising:
    receiving, over a data transmission network, transaction requests from a plurality of delegate users who are delegated from an owner, wherein the transaction requests include digital credentials for the delegate users, the digital credentials being digital security mechanisms associated with users' identities;

processing the transaction requests; and communicating transaction information to a central service, wherein the transaction information includes the digital credentials of the delegates, the transaction information communicated to create, for the plurality of delegate users, activity reports regarding the usage of the digital credentials, the activity reports created at the central service that said owner is allowed to view while each delegate is allowed to view only their own activity report and not allowed to view reports for other delegates.

14. The method of claim 13, wherein processing the transaction requests includes communicating the digital credentials to the central service for verification.

15. The method of claim 13, wherein processing a requested transaction includes:

verifying the digital credential; and communicating a result of the verification to the credential service.

16. The method of claim 13 further includes receiving an activity report from the central service, wherein the activity report lists the transaction information for each digital credential.

17. The method of claim 13, wherein the transaction information includes at least one of a message that was signed, a transaction value, an online service, an internet protocol (IP) address, a value of the transaction, a date of the transaction and a the time of the transaction.

18. An article comprising a machine-readable medium storing instructions operable to cause one or more machines to perform operations comprising:

receiving, over a data transmission network, use information describing a first use of a digital credential by an owner of a digital credential, at any of a plurality of different services where the digital credential can be used, the digital credential being a digital security mechanism associated with the owner's identity;

receiving use information describing a second use of the digital credential by a delegate of the owner of the digital credential, at any of the plurality of different services where the digital credential can be used;

storing the use information in an activity log;

generating an activity report for the delegate based on the activity log;

generating an activity report for the owner based on the activity log;

allowing said owner to view all reports; and allowing said delegate to view only the activity report for the delegate and not the activity report for the owner or activity reports for other delegates.

19. The article of claim 18, wherein the use information includes transaction information.

20. The article of claim 18, wherein the use information includes verification information for the digital credential.

21. The article of claim 19, wherein the transaction information includes at least one of a message that was signed, a transaction value, an online service, an internet protocol (IP) address, a value of the transaction, a date of the transaction and a time of the transaction.

22. The article of claim 18, wherein the digital credential includes a digital signature key, and further wherein generating the activity report includes associating a name to the digital signature key and listing the name of the digital signature key.

23. The article of claim 18, wherein generating the activity report for the owner includes generating the activity report upon request by an owner of the digital credential.

24. The article of claim 18, wherein generating the activity report includes generating the activity report each time the digital credential is verified.

25. The article of claim 18, wherein generating the activity report includes generating a report periodically.

26. The article of claim 18, wherein the operations further comprise analyzing the activity log to detect misuse of the digital credential.

27. The article of claim 18, wherein generating the activity report includes listing activity for a plurality of digital signature keys associated with the owner.

28. The article of claim 18, wherein the operations further comprise:

authorizing one or more delegates to use a delegated digital credential to act on behalf of the owner of the digital credential for specified functions, wherein verifying the use of the digital credential includes determining whether the delegated digital credential was authorized for the specific use.

29. The article of claim 18, wherein generating the activity report for the owner includes generating activity reports of the delegates of the owner.

30. An article comprising a machine-readable medium storing instructions operable to cause one or more machines to perform operations comprising:

receiving, over a data transmission network, transaction requests from a plurality of delegate users who are delegated from an owner, wherein the transaction requests include digital credentials for the delegate users, the digital credentials being digital security mechanisms associated with users' identities;

processing the transaction requests; and communicating transaction information to a central service, wherein the transaction information includes the digital credentials of the delegates, the transaction information communicated to create, for the plurality of delegate users, activity reports regarding the usage of the digital credentials, the activity reports created at the central service that said owner is allowed to view while each delegate is allowed to view only their own activity report and not allowed to view reports for other delegates.

31. The article of claim 30, wherein processing the transaction requests includes communicating the digital credentials to the central service for verification.

32. The article of claim 30, wherein processing a requested transaction includes:

verifying the digital credential; and communicating a result of the verification to the credential service.

33. The article of claim 30, wherein the operations further comprise receiving a activity report from the central service, wherein the activity report lists the transaction information for each digital credential.

34. The article of claim 30, wherein the transaction information includes at least one of a message that was signed, a transaction value, an online service, an internet protocol (IP) address, a value of the transaction, a date of the transaction and a the time of the transaction.

* * * * *